Patented Dec. 15, 1931

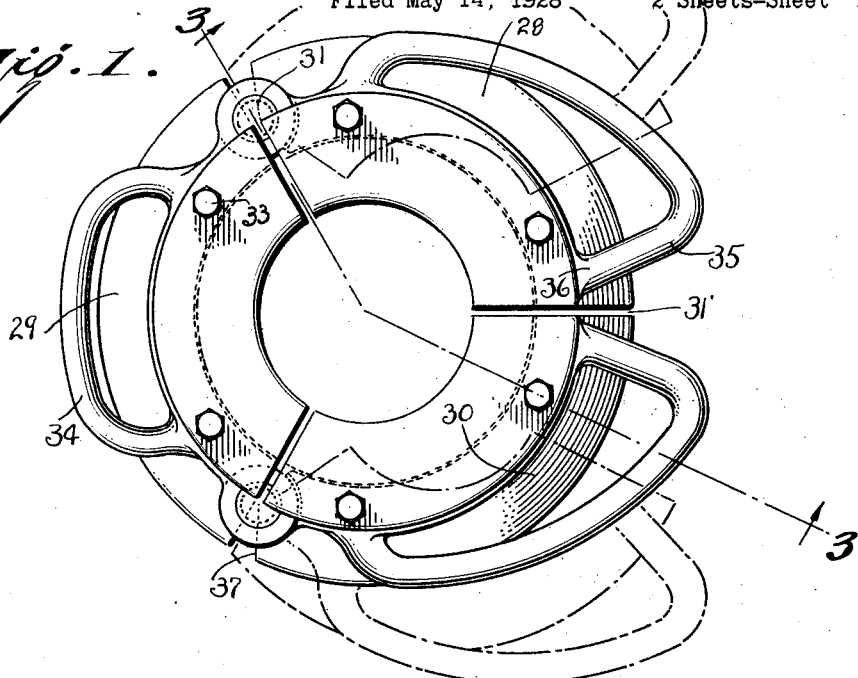
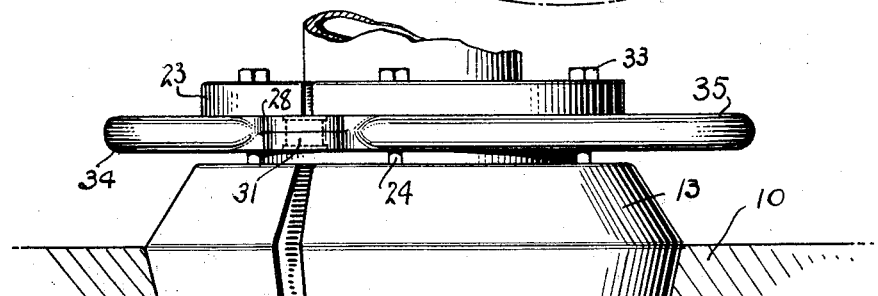

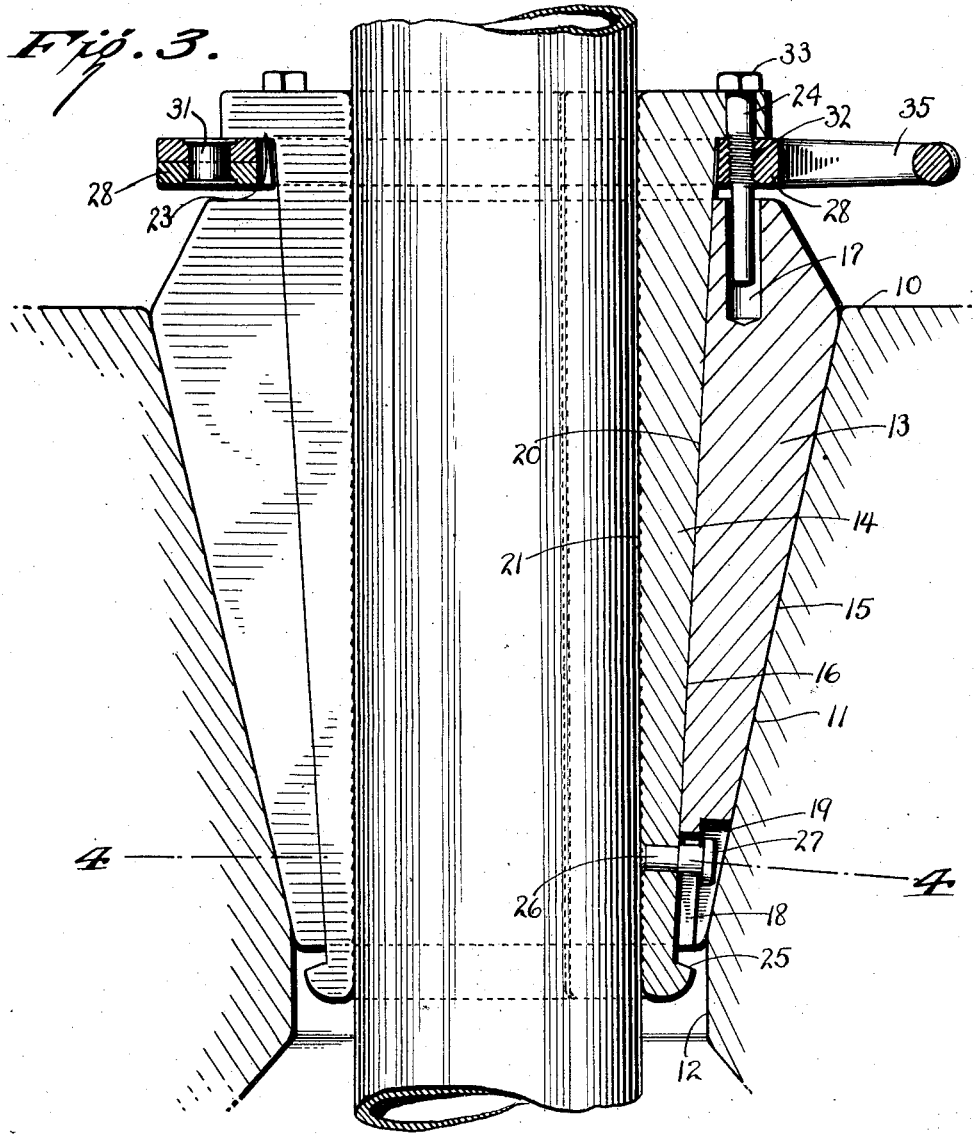
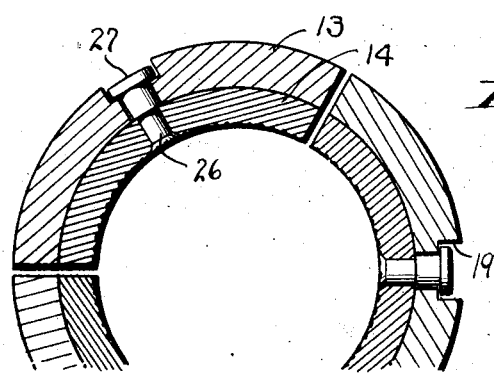

1,836,596

UNITED STATES PATENT OFFICE

JOHN E. HOFFOSS AND LEE O. KOEN, OF HOUSTON, TEXAS, ASSIGNORS TO W-K-M COMPANY, INC., OF HOUSTON, TEXAS, A CORPORATION OF TEXAS

PIPE HOLDING DEVICE

Application filed May 14, 1928. Serial No. 277,585.

Our invention relates to improvements in means for holding pipe in well drilling and pumping operations.

Drill pipe is formed in sections of about twenty feet in length, coupled together; and in inserting it into the well or removing it from the well, the pipe is held by pipe engaging slips while the joints are made up. In this operation, it is common to provide a bushing, or adapter, to be placed within a well casing or within a seat in the rotary table, said bushing or adapter having a tapered seat therein to receive pipe engaging slips which are adapted to wedge between the bushing and the pipe and support the pipe while the joints are being screwed up or unscrewed.

The slips which are employed in holding the pipe in operations such as these are commonly two or more in number. The most common type of slip has two separate members or units which are each made up of a plurality of separate jaws which are independently adjustable relative to each other. When two of these multiple jaw slips are used, two separate helpers, or floor men, are necessary to handle the slips while the pipe is being operated upon. Each helper operates his own separate slip and the two helpers together endeavor to set the slips simultaneously within the tapered seat of the bushing so that they will engage the pipe uniformly on all sides. This is difficult to accomplish and, as a result the pipe is sometimes mutilated by the unequal seizing of the pipe by the slips.

It is an object of our invention to provide one slip to entirely surround the pipe, said slip being made up of a plurality of jaws so mounted and constructed that they may be handled by one workman upon the derrick floor and adapted to engage the pipe uniformly and evenly on all sides.

It is also an object to provide a jaw construction which is formed to engage the pipe firmly so that it will not slip and which is also adapted to release readily when the pipe is raised.

It is also an object to provide a slip of this character which is simple in construction and economical to manufacture and which may be easily assembled for use.

It is also desired that the slip be so constructed that when it is handled by one operator it will automatically open and release the pipe without effort on the part of the operator, and when inserted into the tapered bushing the jaws will engage the pipe uniformly on all sides.

These and other objects are accomplished by a construction, the preferred embodiment of which is disclosed in the accompanying drawings and reference is made thereto for a more clear understanding of the invention. In Fig. 1 is seen a top plan view of the invention, shown in closed position. Fig. 2 is a side elevation thereof. Fig. 3 is a vertical section taken on the plane 3—3 of Fig. 1. Fig. 4 is a transverse section on the plane 4—4 of Fig. 3.

In carrying out our invention we contemplate the use of a single slip made up of a plurality of jaws, preferably three in number and in the drawings herewith a slip having three jaws is shown. This slip, as is customary with tools of this kind, is adapted to fit within the tapered seat 11 formed within bushing 10. Said seat is tapered downwardly at the desired angle for a suitable distance. At a line spaced from the lower side of the bushing, it terminates in a cylindrical portion 12 of sufficient size to allow the passage through the same of the drill stem and the tool joints thereon. We contemplate making the seat tapered on a comparatively obtuse angle relative to the axis of the drill stem operating therein, as will be later set out.

The jaws making up the slip are each made in two sections, an outer section 13 and an inner section 14, said outer section 13 having its outer face 15 formed on an angle to fit within the tapered seat 11 of the bushing. The inner face of section 13 is also tapered downwardly but at a more acute angle relative to the axis of the pipe than is the outer face. The lower end of each jaw section 13 is formed with a longitudinally extending slot 18 therein, the outer side of said slot being increased somewhat in width to provide a recess 19 into which the head 27 of a stud 26 is adapted to fit. The upper end of each section 13 is formed with recesses 17 adjacent each side thereof, there being two recesses in each section. Said recesses are adapted to receive the lower ends of the pins 24 which will be later referred to.

The inner section 14 of each jaw has its outer surface 16 tapered to fit the inner face of the section 13 and its inner face 21 is normally vertical and parallel with the outer face of the pipe. It may be roughened or knurled to more firmly engage the outer surface of the pipe as desired. The lower end of the section 14 has a central stud 26 therein previously referred to, said stud extending radially outward to fit within the slot 18. The head 27 thereon serves to hold the lower end of the section 13 slidably in engagement with the outer face of the section 14. Below the lower end of the section 13 the inner section is provided with an outwardly extending flange 25, the upper surface of which forms a downwardly inclined shoulder. The said shoulder is adapted to engage beneath the lower end of the section 13 and is downwardly inclined to prevent the lodging thereon of sand and mud which might interfere with the smooth operation of the device.

The upper end of each section 14 extends above the section 13 and has a marginal flange thereon extending over the upper end of the corresponding section 13 and spaced therefrom.

Below the flanges 23 of the three inner sections 14 making up the slip is a sectional ring or plate 28. Said plate is made in three sections corresponding with the sections of the slip and is hinged together at two joints between adjacent jaws as shown at 31. The plate sections are not connected at their meeting ends at 31' and the two forward jaws may thus be swung apart to open the slip along the line 31' so as to allow said slip to be fitted about the pipe. The plate is secured beneath the upper flanges of the inner sections 14 by means of the pins 24. As will be seen from Fig. 1 there are two pins 24 extending through the flange of each of the jaws and through the plate 28, the connection between the pins and the plate being a threaded one. The lower end of each pin projects below the plate to fit within the recess 17 in the section 13 of the jaw below it. This engagement holds the plate 28 firmly against the flanges of the inner sections 14 and allows the lower end of each pin to fit loosely and slidably within recess 17 of the lower section.

It will be noted that the outer section 13 of each jaw is held to the inner section at the upper end by this engagement between the pins 24 and the recesses 17 and its lower end is held to the inner section by engagement of the stud 26 within the slot 18, and it will be obvious that when the two sections of each jaw are to be assembled together the pins 24 will be unscrewed from the inner section and the plate, the lower end of the section 13 will then be moved downwardly over the end of the stud 26 and the upper end thereof will then be moved inwardly, and the pins 24 screwed into position as shown in Fig. 3. The upper end 33 of the pin is made polygonal for this purpose. The outer section will thus have a free vertical movement relative to the inner section 14 when the slip is operated as will be later described.

The plate 28 thus secured to the inner sections 14 of the jaws is provided with three handles, one above each of the jaws. The central section of the plate secured to the central jaw 29 is made with the handle 34 formed on an arc corresponding with that of the slip section. On each of the forward jaws 30, 30, the handles 35 are connected rigidly with the hinged side of the plate and extend forwardly and are recurved abruptly and attached to the free ends of the plate sections adjacent the meeting point 31' of the slip as shown at 36. This construction will be easily noted from Fig. 1. The ends of the forward sections of the hinged plate adjacent the pivotal points 31 are beveled away from the adjacent section as seen at 37 to allow for an outward swing of the forward sections of the plate and the slip.

In the operation of the slip as disclosed, the operator will be able to seize the two forward handles and it will be seen from Fig. 1 that this may be done with the open side away from the operator. Engaging these two handles he will be able to raise the slip and in this movement the operator will incline the slip toward him so as to cause the opposite slips 30 to swing open so as to release the pipe. The construction of the slip allows the parts to be made sufficiently light in weight so that one operator is able to raise the slip from the seat in the bushing and place it aside upon the derrick floor.

Our slip has a firm gripping action because of the strong wedging effect due to the acute taper of the outer surface of each section 14 engaging the inner face of the corresponding section 13. At the same time the engagement of the section 13 with the bushing 10 will be on a more obtuse angle relative to the axis of the pipe and will release when the pipe is raised. Thus when the slip is introduced into the bushing about the pipe, the outer surface of the section 13 will engage within the bushing and force the inner section 14 frictionally against the pipe and the downward movement of the pipe will then force the section 14 into a firm engagement between the pipe and the section 13, preventing danger of slipping of the pipe on the jaw. It is to be noted that the employment of these two sections of each jaw enables the inner section to firmly engage the pipe, so that without the releasing feature of the outer jaw section the pipe could not be readily disengaged from the slip. With the section 13 in place, on the raising of the pipe, however, the slip will readily release from the bushing and when thus free of the bushing it will drop away from the outer face of the forward section 14 as the pipe is again elevated, and allow the disengagement of the jaw and the pipe. There will be free relative movement longitudinally of the two sections of each jaw sufficient to allow the slip to grip the pipe and again release it as has been described.

It will be obvious that the inventive ideas disclosed in this application do not depend upon the exact construction disclosed in the drawings and set out herein, it being obvious that certain changes may be made therein within the scope of our invention without departing from the spirit thereof.

What we claim is:

1. A pipe holding device comprising a plurality of jaws arranged to entirely surround the pipe, each jaw including an inner and an outer section connected together, the inner section having an upper radial flange, a sectional plate secured beneath the flanges of said jaws, hinges in said plate allowing said jaws to swing open at one side of said device and handles on said plate to move said jaws.

2. A pipe holding device comprising a plurality of jaws arranged to entirely surround the pipe, each jaw including an inner and an outer section connected together but longitudinally slidable relative to each other, the inner section having an upper radial flange, a sectional plate secured beneath the flanges of said jaws, hinges in said plate allowing said jaws to swing open at one side of said device, and handles on said plate to move said jaws.

3. A pipe holding device comprising a plurality of jaws arranged to entirely surround the pipe, each jaw including an inner and an outer section, means to connect said sections, the outer face of each section being tapered downwardly, the outer section being tapered at a more obtuse angle relative to the vertical than is the inner section, the inner section having an upper radial flange, a sectional plate secured beneath the flanges of said jaws, hinges in said plate allowing said jaws to swing open at one side of said device, and handles on said plate to move said jaws.

4. A pipe holding slip comprising a plurality of jaws which together entirely surround the pipe, outer and inner sections to each jaw, the outer section having a comparatively obtuse taper for quick release, the inner section having a more acute taper to wedge against the said pipe, said sections having means to limit relative longitudinal movement, a sectional plate connected to the inner sections, and handles on said plate.

5. A pipe holding slip comprising a plurality of jaws which together entirely surround the pipe, outer and inner sections to each jaw, the outer sections having a comparatively obtuse taper for quick release, the inner sections having a more acute taper to wedge against the said pipe, said sections having relative longitudinal movement, a sectional plate connected to the inner sections, said outer sections being connected to and slidable longitudinally upon said inner sections.

6. A pipe holding slip comprising a plurality of jaws which together entirely surround the pipe, outer and inner sections to each jaw, the outer sections having a comparatively obtuse taper for quick release, the inner sections having a more acute taper to wedge against the said pipe, said inner sections extending above said outer sections and having radial flanges thereon, a sectional plate shaped to fit below said flanges and hinged to open at one side, pins securing said plate to said flanges and also acting to connect said outer sections loosely to said inner sections at the upper end, and means securing the lower ends of said sections together.

7. A pipe holding slip comprising a plurality of jaws which together engage entirely around a pipe, each jaw having outer and inner interfitting sections, means hinging together the upper ends of the inner sections to open at one side of the slip, a radial stud on one section of each jaw engaging within a longitudinal slot in the interfitting section, and longitudinal pins in the upper ends of the inner sections engaging loosely within the outer sections, said outer sections being tapered at different angles relative to the vertical on their outer and inner surfaces.

8. In combination with a slip bowl having a downwardly tapering bore, a slip mechanism for use therewith comprising a plurality of slip sections each embodying inner and outer downwardly tapering elements having their adjacent faces slidably engaged, connections between the elements of each section permitting relative shifting thereof longitudinally while preventing separation or relative transverse movement, the upper ends of the inner elements having shoulders overlying the upper ends of the outer elements, and means connecting the elements including pins directed through said shoulders and slidably engaging in sockets formed in the upper ends of the outer elements.

9. In combination with a slip bowl having a downwardly tapering bore, a slip mechanism for use therewith comprising a plurality of slip sections each embodying inner and outer downwardly tapering elements having their adjacent faces slidably engaged, the lower end of one element of each section being slotted, the other element having a headed stud engaging in said slot and from which the first named element is disengageable upon a predetermined longitudinal movement thereof, and means carried by one of said elements and detachable therefrom for limiting such longitudinal movement.

10. In combination with a slip bowl having a downwardly tapering bore, a slip mechanism for use therewith comprising a plurality of slip sections each embodying inner and outer downwardly tapering elements having their adjacent faces slidably engaged, the outer element of each section having a slot, the inner element having a headed stud operating in the slot, the upper end of the inner element of each section having a shoulder overlying the upper end of the outer element and pins directed through said shoulders and engaged in sockets formed in the upper ends of the outer elements.

11. In combination with a slip bowl having a downwardly tapering bore, a slip mechanism for use therewith comprising a plurality of slip sections each embodying inner and outer downwardly tapering elements having their adjacent faces slidably engaged, the outer element of each section having a slot, the inner element having a headed stud operating in the slot, the upper end of the inner element of each section having a shoulder overlying the upper end of the outer element and pins directed through said shoulders and engaged in sockets formed in the upper ends of the outer elements, the shoulders of the inner elements being so spaced from the studs thereof that the stud and slot engagement of the inner and outer elements may be broken by moving the outer elements upwardly to a point immediately beneath said shoulders, said pins being removable from said shoulder.

12. In combination with a slip bowl having a downwardly tapering bore, a slip mechanism for use therewith comprising a plurality of slips sections, each embodying inner and outer downwardly tapering elements having their adjacent faces slidably engaged, the outer element of each section having a slot, the inner element having a headed stud operating in the slot, the inner element having a shoulder overlying the outer element, and means removably attached to said shoulder on said inner element to co-operate with said stud and slot to secure said elements loosely together.

13. A pipe engaging slip including inner and outer sets of co-axial annularly arranged jaws, outwardly extending flanges on the upper and lower ends of said inner jaws, means projecting from each of said inner jaws and adapted to loosely engage each of said outer jaws whereby relative movement of said jaws is permitted.

14. A pipe engaging slip comprising a pair of co-axial loosely connected sets of jaws, pins extending axially and radially of one of said sets, and co-operating openings adapted to receive said pins in the other of said sets, the openings being of such size to allow relative movement of said sets.

15. A pipe engaging slip comprising a pair of co-axial loosely connected sets of jaws, pins extending axially and radially of one of said sets, co-operating openings to receive said pins in the other of said sets, whereby relative movement of said sets is permitted, and a hinged plate arranged to engage one of said sets for manipulation thereof.

In witness whereof we hereunto affix our signatures this 2d day of May, A. D. 1928.

JOHN E. HOFFOSS.
LEE O. KOEN.